United States Patent [19]

Dekumbis et al.

[11] Patent Number: 4,785,775

[45] Date of Patent: Nov. 22, 1988

[54] WEAR LAYER FOR PISTON AND CYLINDER OF AN INTERNAL COMBUSTION ENGINE

[75] Inventors: Roger Dekumbis, Saint-Sulpice; Marc-Olivier Borel, Winterthur; Ulrich Ritter, Buch am Irchel; Gerard Barbezat, Zell, all of Switzerland

[73] Assignee: Sulzer Brothers Limited, Winterthur, Switzerland

[21] Appl. No.: 761,041

[22] Filed: Jul. 31, 1985

[30] Foreign Application Priority Data

Dec. 20, 1984 [CH] Switzerland ........................ 6070/84

[51] Int. Cl.$^4$ ........................ F02F 1/18; F02F 3/10; B32B 15/04

[52] U.S. Cl. ........................ 123/193 CP; 428/627

[58] Field of Search ........... 123/657, 668, 669, 193 R, 123/193 P, 193 C, 193 CP; 29/156.4 WL; 148/902, 903, 910, 4; 428/614, 627

[56] References Cited

U.S. PATENT DOCUMENTS

| | | | |
|---|---|---|---|
| 3,199,836 | 8/1965 | Moyer | 415/172 |
| 3,536,123 | 10/1970 | Izumi | 123/193 C |
| 3,886,637 | 6/1975 | Ellis et al. | 29/156.4 WL |
| 3,920,412 | 11/1975 | Jones | 428/627 |
| 3,952,180 | 4/1976 | Gnanamuthu | 428/627 |
| 4,015,100 | 3/1977 | Gnanamuthu et al. | 428/627 |
| 4,068,645 | 1/1978 | Jenkinson | 123/193 C |
| 4,161,207 | 7/1979 | Fluckinger et al. | 428/627 |
| 4,177,324 | 12/1979 | Brown et al. | 428/627 |
| 4,232,094 | 11/1980 | Rhodes et al. | 428/614 |
| 4,243,727 | 1/1981 | Wisler et al. | 428/627 |
| 4,341,826 | 7/1982 | Prewo et al. | 123/657 |
| 4,483,286 | 11/1984 | Herrmann et al. | 123/193 P |
| 4,530,322 | 7/1985 | Yamada et al. | 123/188 A |
| 4,650,722 | 3/1987 | Brown et al. | 428/627 |
| 4,666,786 | 5/1987 | Yano et al. | 428/627 |

OTHER PUBLICATIONS

Nominal Dimensions of Standard Sieves, Table 3, pp. 84 and 85.

*Primary Examiner*—Willis R. Wolfe, Jr.
*Assistant Examiner*—M. Macy
*Attorney, Agent, or Firm*—Kenyon & Kenyon

[57] ABSTRACT

A wear layer is provided for each of a piston and cylinder of an internal combustion engine in which ash-producing fuels of solid-liquid mixtures are combusted. Each layer consists of a hard phase and a second phase of lower hardness and greater toughness. Each wear layer has a minimum thickness of one millimeter; the hard phase has a minimum hardness of 1900 HV with a mean chord length in the running direction of from 30 to 200 microns. There is a metallurgical bond between the phases in the wear layer as well as between the wear layer and the substrate. In addition, the hard phases of the respective wear layers have an almost equal hardness value.

12 Claims, 1 Drawing Sheet

WEAR LAYER FOR PISTON AND CYLINDER OF AN INTERNAL COMBUSTION ENGINE

Figure 1:
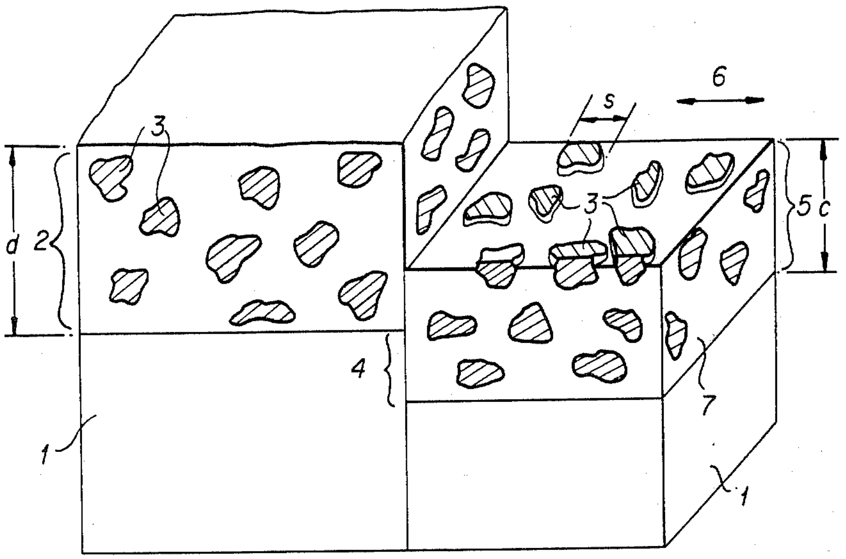

This invention relates to a wear layer for a piston and a cylinder in an internal combustion engine.

As is known, internal combustion engines of the type which employ a piston and cylinder arrangement may sometimes operate with slurry type fuels of solid-liquid mixtures. In such cases, particularly in the case of diesel engines, a relatively large amount of ash occurs, for example more than 0.05% of the quantity of fuel supplied. Further, this ash generally contains, in part, hard quartz grains. Therefore, it has been common practice to provide the contact surfaces of the parts of the piston internal combustion engine which move relative to each other, that is, the piston rings of a piston and the liner of a cylinder in which the piston moves, with wear layers Usually, these layers are produced by remelting of the substrate materials of the cylinder and piston so that a carbidic structure is produced in layer thicknesses of up to several millimeters, for example as described in WO No. 83/03261. Usually, these wear layers obtain substantially lower abrasion rates than untreated contact surfaces. However, in practice, where slurry type fuels of solid-liquid mixtures are used, the abrasion is still too high.

Accordingly, it is an object of the invention to provide abrasion rates for the contact surfaces of a piston and a cylinder of a piston internal combustion engine when using slurry type fuels which correspond at least approximately to those with the use of ash-free fuels.

It is another object of the invention to reduce the wear in a piston and cylinder arrangement of an internal combustion engine where use is made of a slurry type fuel of solid-liquid mixtures.

It is another object of the invention to reduce the wear in a piston and a cylinder arrangement of an internal combustion chamber wherein slurry type fuels are combusted.

Briefly, the invention provides a wear layer for a piston as well as a cylinder in an internal combustion engine which is operated with a slurry type fuel of solid-liquid mixtures. Each wear layer is of a thickness greater than one millimeter and is characterized as having at least one hard phase and a second phase metallurgically bonded to the hard phase.

The hard phase is characterized in having a hardness greater than 1900 HV, as measured according to DIN 50133 in at least 80% of the phase. In addition, the hard phase has a mean chord length in the direction of movement of the piston of from 30 to 200 microns (μm).

The second phase is characterized as having a greater toughness than the hard phase and a hardness less than the hardness of the hard phase. In addition, a metallurgical bond exists between each layer and the substrate on which the layer is formed.

Where the wear layer is provided on a surface not only of the piston, for example on piston rings, but also on the cylinder, for example a liner within the cylinder, any ash particles which are produced during combustion of a slurry type fuel within the internal combustion engine will be ground between the wear layers to grain sizes which can then be flushed out of the combustion or cylinder chamber by a lubricating oil, for example, through a lubrication slit provided for the oil. For example, the grain sizes of the ground ash should be under 0.5 microns (μm).

In order to remove the ash particles by grinding and flushing out of the cylinder chamber, a high minimum hardness value of the hard phase of each wear layer is required as well as a good adhesion of the wear layer on the respective substrate material or, respectively, of the hard phase in the second phase. This good adhesion is achieved by metallurgical bonds.

After the piston and cylinder have run in, the hard phase will protrude slightly, for example up to 2 microns (μm) from the second phase in known manner on each of the piston and cylinder. During reciprocation of the piston within the cylinder, larger ash particles become wedged between the two hard phase particles of the respective wear layers and are shorn off and comminuted thereby. Thus, the grinding requires a minimum length of the hard phases in the running direction, i.e. the direction of movement of the piston relative to the cylinder, if the phases are not to be broken out instead of grinding the ash.

The second phase may have a hardness of from 400 to 800 HV, as measured according to DIN 50133. Further, this second phase may consist of a separate metallic material or of the substrate material of the structural part itself. By "metallurgical bond" is understood that the union between substrate material and wear layer has come about by a partial melting of the two components and subsequent solidification of the melt. Therefore, wear layers can, to advantage, be produced by edge layer remelt alloying or by built-up welding.

The required rate of toughness of the second phase can be determined in known manner by mechanical-technological tests and metallurgical examinations, for example according to DIN 50115.

The hard phase may be made of a suitable material such as one selected from the group consisting of oxides, nitrides, borides, carbides or solid solutions of these substances.

If, in the operation of the engine, a shortage of lubricant develops between the two contact surfaces, i.e. the surfaces of the piston and cylinder, this may result in contact of the hard phases of the two surfaces. In such a case, the mutual abrasion of the two hard phases should be uniform to the extent possible. For this reason, substantially equal hardness values of the hard phases are necessary.

The hard phase proportion in each of the two wear layers is to advantage 30 to 70% by volume. Because of the high temperature occurring in the combustion chamber, the structures of the two-phase wear layer should be stable to at least 250° C. To suppress, as much as possible, liquation due to gravity for the hard phases in a liquid second phase, the density of the hard material advantageously does not differ more than 50% from that of the liquid second phase.

Also, it has been found favorable if the hard phase is relatively insoluble in the second phase when the second phase is in a liquid state, because otherwise the hard phase crystallites forming or introduced will dissolve relatively quickly in the second phase, and the build-up of a hard phase meeting the mentioned requirements is then no longer assured in the wear layer.

In the following, the invention will be explained more specifically with reference to two examples.

EXAMPLE 1

The substrate material for a cylinder liner and the piston rings of an internal combustion engine is assumed to be a cast iron GG 35 (DIN 1691) of the chemical composition (in wt. %): C 3.1; P 0.03; S 0.02; Si 1.2; Mn 0.4; Ni 0.8; Mo 0.4; Cu 1.5 and balance iron (Fe). The contact surfaces of both substrates receive the following treatment:

First, a layer of Cr-Mo-V is applied by plasma spraying, for which the individual parameters are determined experimentally in a preliminary test, the components being present in equal quantity, so that there results a mixture ratio of 1:1:1. Application of the plasma spray layer is continued until a layer thickness of at least 0.5 millimeter (mm) is reached.

The next step is remelt alloying by TIG welding, in which, in an inert gas atmosphere—e.g. helium—the plasma-coated contact surface is fused by means of a tungsten electrode to a depth of at least 1 millimeter (mm) so that the layer and the outer zone of the substrate form a liquid melt in which the liquid components mix intimately.

During the subsequent cooling, alloy carbides with Cr, Mo and V form a hard phase along with a second phase, consisting of a steel matrix, which covers the contact surface.

The cooling of the liquid melt is timed, e.g. slowed, so that the crystallites of the special carbides can grow to a size which ensures that the mean chord length of the hard phase in the running direction is in the range of from 30 to 200 microns (μm).

Lastly, the wear layer or contact surface of both substrates is subjected to flame hardening. In this hardening, the wear layer is heated with a flame, for example an oxygen/acetylene flame, to about 800°-1200° C., perferably 900° C., and is then chilled with a chilling nozzle, usually with water. While the hardness of the hard phase, measured according to DIN 50133, has been determined to be 1900 HV, that of the second phase is 500 HV. Between this second phase and the substrate material as well as the hard phase, there exists a metallurgical bond—caused by solidification from the mixed melts.

EXAMPLE 2

Here the substrate material is a cast steel with code name GS-20 MnMoNi 5 5 (DIN 17006).

First, a paste consisting of 60% by weight tungsten carbide and 40% by weight a special steel 50 CrV 4, both in powder from, is aplied on the contact surfaces. The two components are held together—and on the contact surface—by a commercially available organic binder.

To assure the required mean chord lengths for the hard phases in the finished wear layer, the grain size of the tungsten carbide powder, whose hardness is known to be, depending on the ratio $WC/W_2C$, between 1990 and 2350 HV, is between 50 and 200 μm. The thickness of the applied paste is at least 2 millimeters (mm).

By means of a $CO_2$ high performance laser build-up welding is now carried out, in which the applied powder mixture is compacted by remelting to at least close to the theoretical value of its density of about 13 g/cc. Simultaneously with this build-up welding, a layer of substrate material 0.15 to 0.2 millimeters (mm) thick is fused, so that at least the substrate material and the special steel mix in the liquid state. The tungsten carbide grains already introduced as a hard phase are superficially fused by the laser beam, so that a firm metallurgical bond forms within the wear layer.

The second phase of the wear layer forms essentially during solidification of the introduced special steel, whose hardness is about 450 HV.

In summary, each wear layer is characterized as follows:

(a) each layer has at least one hard phase and a second phase which has a lower hardness and greater toughness than the hard phase;

(b) the hardness value of the hard phase is greater than 1900 HV in at least 80% of the hard phase;

(c) the thickness is greater than one millimeter;

(d) the mean chord length of the hard phase zones in the contact surface are in the range of from 30 to 200 microns (μm), in the running direction;

(e) a metallurgical bond exists between the phases in each layer and also between the layer and the substrate; and (f) the hardness values of the hard phases of the wear layers on the relatively moveable parts are nearly the same as possible, that is, the differences is at most 20%.

The invention thus provides a wear layer which can be used on both a piston and a cylinder of an internal combustion engine in order to grind down ash particles which are produced during combustion of a slurry type fuel. In this way, the wear layers impart a longer life to the engine.

The invention further provides a wear layer which can be used on both a piston and a cylinder of an internal combustion engine to grind down hard ash particles which consist mostly of quartz crystals so that the comminuted particles can be carried away by a lubricating oil through a lubrication slit between a cylinder wall and a piston ring.

Schematically FIG. 1 shows the structure of a wear layer manufactured according to example 2. FIGS. **2*a* and 2*b*** show the effect of chord length.

On the left side of FIG. 1 the substrate material 1 is coated by the paste 2 consisting of tungsten carbide particles 3 mixed with the powder of the special steel named in example 2. Both components are held together by an organic binder known per se.

Before the build-up welding or remelting procedure the thickness d of the layer of the paste 2 is 2 mm at least.

On the right the wear layer 5 is shown after the build-up welding of the surface; the layer material 2 has been compacted by the welding to a thickness c of about 1 mm in the layer 5. During the welding operation a layer 4 of the substrate material 1 is fused in order to form a metallurgical bond between the layer 5 and the substrate 1 after solidification; said layer 4 is about 0.15 to 0.2 mm thick. The double-arrow 6 indicates the running direction as defined before (page 3).

The grain sizes of the hard particles 3 are 50 to 200 μm to assure the required mean chord length s in the running direction.

The FIGS. **2*a* and 2*b* illustrate the effects of an insufficient and of a sufficient chord length s of the hard particles 3 in a schematic way. The reference 10 designates a cylinder surface coated with a wear layer 5 according to FIG. 1; 11 is the running surface of a piston ring which is provided with the same wear layer. On both surfaces hard phase particles 3 project from the second phase or matrix 7 (FIG. 1**) consisting of the special steel.

Figure 2A:
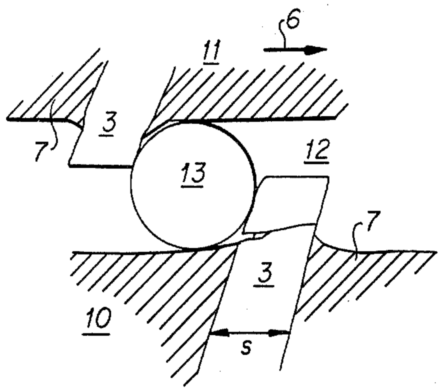
Figure 2B:
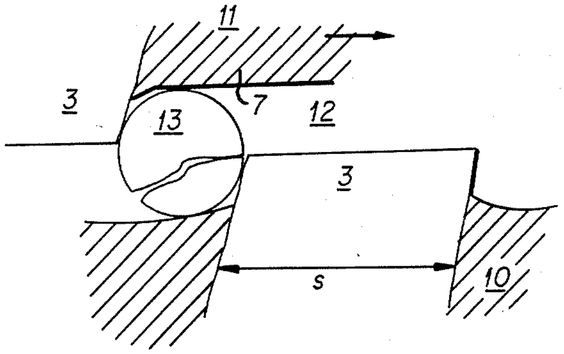

The clearance 12 between the cylinder wall and the piston ring is filled with a lubricating oil film (not shown) which contains hard ash particles 13. The piston ring moves relative to the cylinder wall as indicated by arrow 6. During this movement, the ash particles 13 will be pinched between the projecting hard particles 3. If the chord length s of the hard particles 3 is too small one of the projecting parts of said the particles 3 will break off without grinding the ash particle 13 (FIG. 2*a*). If however the chord length s has the minimum value required claimed, the ash particle 13 will be ground between the two hard phase particles 3 (FIG. 2*b*) and the smaller fragments of the ash particle 13 will be washed out by the lubricating oil through the clearance 12.

What is claimed is:

1. In an internal combustion engine having a cylinder including a first surface and a piston movably mounted in said cylinder with a second surface in contact with said first surface, a wear layer metallurgically bonded on each said surface, each wear layer being of a thickness greater than one millimeter and having at least one hard phase of a hardness greater than 1900 HV in at least 80% thereof with a mean chord length in the direction of movement of said second surface of from 30 to 200 μm, and a second phase metallurgically bonded to said hard phase with greater toughness than said hard phase and a hardness less than said hard phase.

2. A wear layer as set forth in claim 1 wherein said second phase has a hardness of from 400 to 800 HV measured according to DIN 50133.

3. A wear layer as set forth in claim 1 wherein said hard phase occupies from 30% to 70% of said wear layer.

4. A wear layer as set forth in claim 1 characterized in being stable to at least 250° C.

5. A wear layer as set forth in claim 1 characterized in being produced by edge layer remelt alloying.

6. A wear layer as set forth in claim 1 characterized in being produced by built-up welding.

7. A wear layer as set forth in claim 1 wherein said hard phase has a density different from said second phase by not more than 50% of the density of said second phase.

8. A wear layer as set forth in claim 1 wherein said hard phase is insoluble in said second phase with said second phase in a liquid state.

9. A wear layer for a piston and a cylinder in an internal combustion engine, said wear layer being of a thickness greater than one millimeter and having at least one hard phase of a hardness greater than 1900 HV in at least 80% thereof with a mean chord length of from 30 to 200 μm, and a second phase metallurgically bonded to said hard phase with a greater toughness than said hard phase and a hardness less than said hard phase.

10. A wear layer as set forth in claim 9 wherein said second phase as a hardness of from 400 to 800 HV measured according to DIN 50133.

11. In combination a metal substrate; and a wear layer metallurgically bonded on said substrate, said layer including a matrix and a plurality of hard phase particles in said matrix, said matrix having a greater toughness than said hard phase particles and a hardness less than said particles, said particles having a hardness greater than 1900 HV in at least 80% of said hard phase particles, at least some of said hard phase particles projecting from said matrix with a chord length of from 30 to 200 micron.

12. The combination of as set forth in claim 11 comprising a pair of said substrates with a respective wear layer thereon, one of said substrates forming a cylinder and the other of said substrates forming a piston slidably mounted in said cylinder.

* * * * *

UNITED STATES PATENT AND TRADEMARK OFFICE

CERTIFICATE OF CORRECTION

PATENT NO. : 4,785,775

DATED : Nov. 22, 1988

INVENTOR(S) : ROGER DEKUMBIS, et al.

It is certified that error appears in the above-identified patent and that said Letters Patent is hereby corrected as shown below:

Column 3, line 47 "aplied" should be -applied-
Column 3, line 58 "laser build" should be -laser, build-
Column 4, line 20 "differences" should be -difference-
Column 5, line 8 cancel "claimed"
Column 6, line 20 "as" should be -has-
Column 6, line 33 cancel "of"
Column 6, line 32 "micron" should be -microns- Signed and Sealed this Nineteenth Day of September, 1989

*Attest:*

DONALD J. QUIGG

*Attesting Officer*

*Commissioner of Patents and Trademarks*